United States Patent
Mainini et al.

(10) Patent No.: US 6,431,121 B1
(45) Date of Patent: Aug. 13, 2002

(54) BARK CONTROL APPARATUS AND METHOD FOR USE WITH MULTIPLE DOGS

(75) Inventors: Christopher E. Mainini; James L. Jameson, both of Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 72 days.

(21) Appl. No.: 09/690,900

(22) Filed: Oct. 17, 2000

(51) Int. Cl.[7] ............................................. A01K 15/00
(52) U.S. Cl. ..................... 119/718; 119/720; 119/908
(58) Field of Search .................. 119/718, 720, 119/859, 908

(56) References Cited

U.S. PATENT DOCUMENTS

| | | | | |
|---|---|---|---|---|
| 4,202,293 A | * | 5/1980 | Gonda et al. ............... | 119/718 |
| 4,887,549 A | * | 12/1989 | Powell ........................ | 119/718 |
| 5,605,116 A | * | 2/1997 | Kim et al. ................... | 119/720 |
| 5,927,233 A | | 7/1999 | Mainini et al. ............. | 119/718 |

* cited by examiner

Primary Examiner—Robert P. Swiatek
(74) Attorney, Agent, or Firm—Pitts & Brittian, P.C.

(57) ABSTRACT

An apparatus for controlling the barking of dogs in a group setting, or group bark control apparatus, and method for use. The group bark control apparatus detects the barking of the host dog and applies an appropriate correction to the host dog while also broadcasting a desired correction signal to other group bark control apparatuses within range. Upon receipt of the correction signal, the receiving group bark control apparatuses apply the appropriate correction stimulus to their respective dogs, including those which are not currently barking. By preemptively correcting the non-barking dogs in response to the barking of other dogs, the phenomenon known as group barking is hereby avoided.

9 Claims, 3 Drawing Sheets

BARK CONTROL APPARATUS AND METHOD FOR USE WITH MULTIPLE DOGS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to the field of devices for controlling the barking of dogs. More specifically, the present invention relates to an apparatus which discourages a particular dog within a group from barking in response to other dogs.

2. Description of the Related Art

Most people know the problems associated with controlling the barking of a dog. Dogs naturally bark for many reasons such as to signal other dogs, to define their territory, to communicate excitement or fear, and to warn prior to an attack. The phenomenon of group barking occurs when a number of dogs bark in response to one another. This problem is exacerbated in areas where a large number of dogs are held in close confinement, such as in a kennel.

Remote and automatic systems using various trigger mechanisms have been developed to control the barking of a dog. There are three main classifications of systems, differentiated by the input devices and signal processing techniques: the microphone input class, the piezoelectric input class, and the bark comparator class.

Systems utilizing a microphone input are typically the most reliable for discriminating between a bark sound and other false signals. However, to maintain this reliability, the microphone must be kept clear of debris. Additionally, microphone input systems are typically larger, more expensive, and use more power than other systems. Furthermore, microphone input systems are less weather resistant than other systems. Because these systems rely on sound volume, sounds from other animals and environment noises may inadvertently trigger the system.

Piezoelectric input systems are triggered by vibration and are smaller, cheaper, and use less power than other systems. However, the lack of sensitivity in the piezoelectric input results in a high false trigger rate and a low repeatability rate. Receiving a corrective signal as a result of a false trigger confuses the dog and hampers effective training.

Presently available bark comparator systems implement one of the above mentioned input devices coupled with a discrimination circuit which compares a previously recorded bark with the new sound. Accordingly, presently available bark comparator systems suffer from difficulty in getting a good sample for comparison and are not consistent in the application of the discrimination solution. Furthermore, dogs tend to have different barks for different occasions which makes meaningful comparison against the stored sample difficult.

The prior art lacks a system for controlling the barking of a dog which can be used at all times of the day, without the need for human monitoring. Further, none of the prior art devices filter extraneous noises and only apply a corrective stimulus when the particular dog barks in such a way as to trigger the system.

Therefore, it is an object of the present invention to provide a system for controlling the barking of a dog.

It is another object of the present invention to provide such a system for controlling the barking of a particular dog within a group of dogs.

It is a further object of the present invention to provide such a system for deterring other dogs within a group of dogs from barking in response to the barking of another dog within the group.

BRIEF SUMMARY OF THE INVENTION

An apparatus for controlling the barking of dogs in a group setting, or group bark control apparatus, and a method for use is designed to discourage dogs in a group setting from group barking by providing a selected deterrent stimulus, generally a warning, to each dog if any dog barks and a selected deterrent stimulus, generally a correction, to each dog which barks. When a first dog wearing a group bark control apparatus begins to bark, an appropriate deterrent is applied in response to the bark. The group bark control apparatus also activates an transmitter to broadcast a deterrent request signal to other group bark control apparatuses within the broadcast range of the transmitter. An internal receivers detects the deterrent signal request which is passed to a controller for processing. The controller activates the deterrent stimulus generator to apply the appropriate deterrent stimulus to the non-barking dogs which are not currently barking. By preemptively correcting the non-barking dogs in response to the barking of the first dog, the phenomenon known as group barking is hereby avoided.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for controlling the barking of dogs in a group setting, or group bark control apparatus, is illustrated generally at 10 in the figures, a method for use is described. The group bark control apparatus 10 is designed to discourage dogs in a group setting from group barking by providing a selected deterrent stimulus, generally a warning, to each dog if any dog barks and a selected deterrent stimulus, generally a correction, to each dog which barks.

Figure 1:
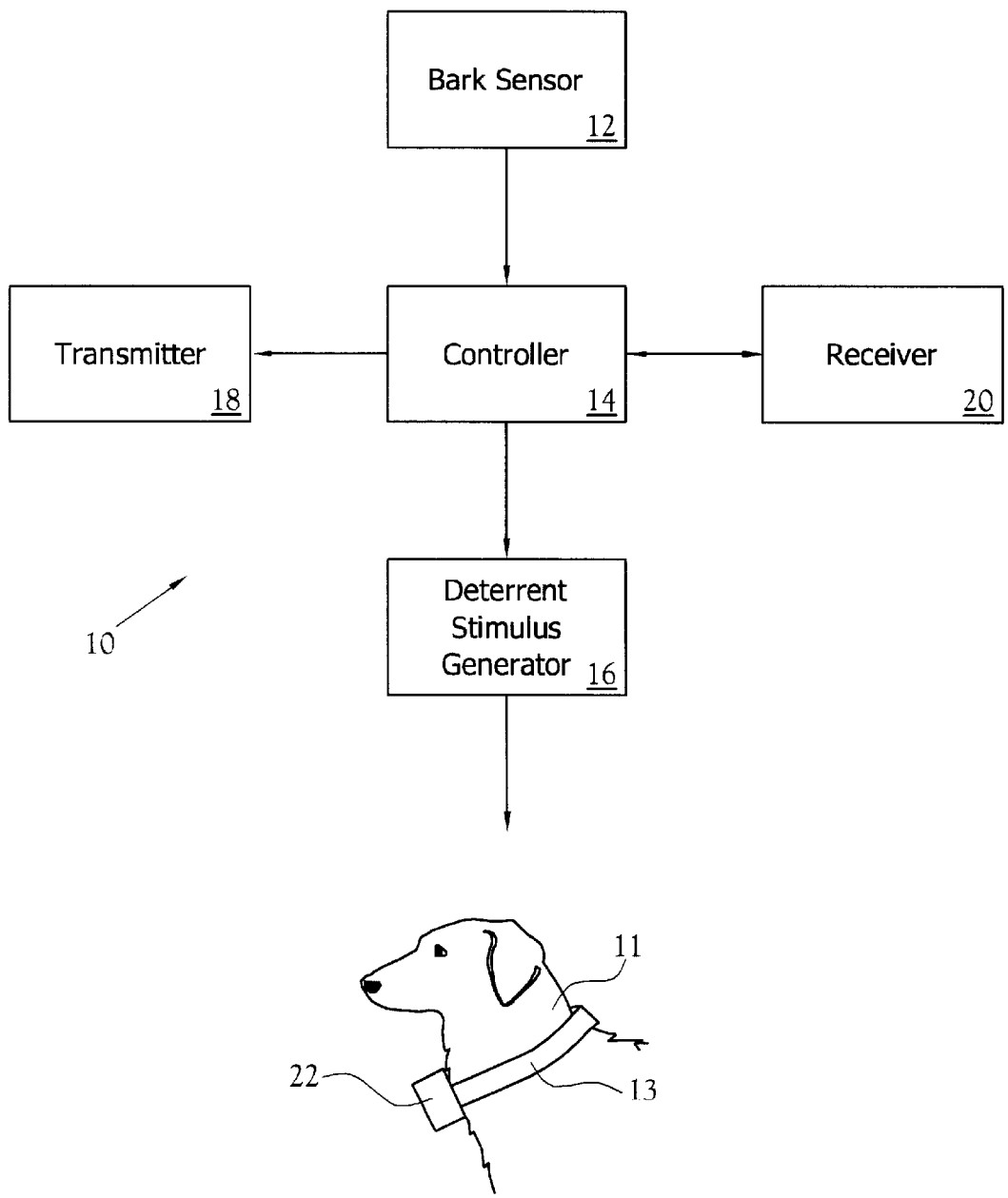
FIG. 1 is a block diagram of the major components of the present invention.

FIG. 1 illustrates a block diagram the group bark control apparatus 10 housed in an enclosure 22 which is attached to a dog 11 using a collar 13, or other similar fastener. A bark sensor 12 monitors the vocal activity of the host dog and generates a bark signal when a bark is detected. Those skilled in the art will recognize that the bark sensor 12 can be selected from any of a number of bark sensing technologies known to those skilled in the art, including vibration sensing and sound sampling, without interfering with the objects and advantages of the present invention. For example, a vibration sensor located proximate the dog's throat detects the vibration of the vocal cords thereby indicating that the host dog is making a sound. Such a sensor is relatively cheap and has relatively low power consumption. Alternately, a microphone used to sample the ambient sounds provides better distinction as to the type of sound being made by the dog than a vibration sensor. However, the microphone-based systems have a higher power consumption and a require additional filtering to prevent erroneous response to extraneous ambient noises.

A controller 14 responsive to the bark sensor 12 sequences operation of each group bark control apparatus 10. Those skilled in the art will recognize that the controller 14 and any other decision making circuitry may be implemented in any one or a combination of several various ways, including, but not limited to, discrete logic, any of various integrated circuit logic types, or a microprocessor, without interfering with the objects and advantages of the present invention. In the preferred embodiment, the controller 14 is a microprocessor. Upon receipt of a bark signal indicating that the host dog has barked, the controller 14 activates a correction stimulus generator 16. The correction stimulus generator 16 produces an appropriate correction stimulus which is applied to the host dog. Those skilled in the art will recognize the various correction stimuli which can be used, including, but not limited to, electrostatic shock, vibration, sound, and chemical deterrent. The group bark control apparatus further includes a transmitter 18 and a receiver 20 which facilitate the control of multiple dogs in the manner described hereinafter. Those skilled in the art will recognize that various transmission/reception methods can be used without interfering with the objects and advantages of the present invention.

Figure 2:
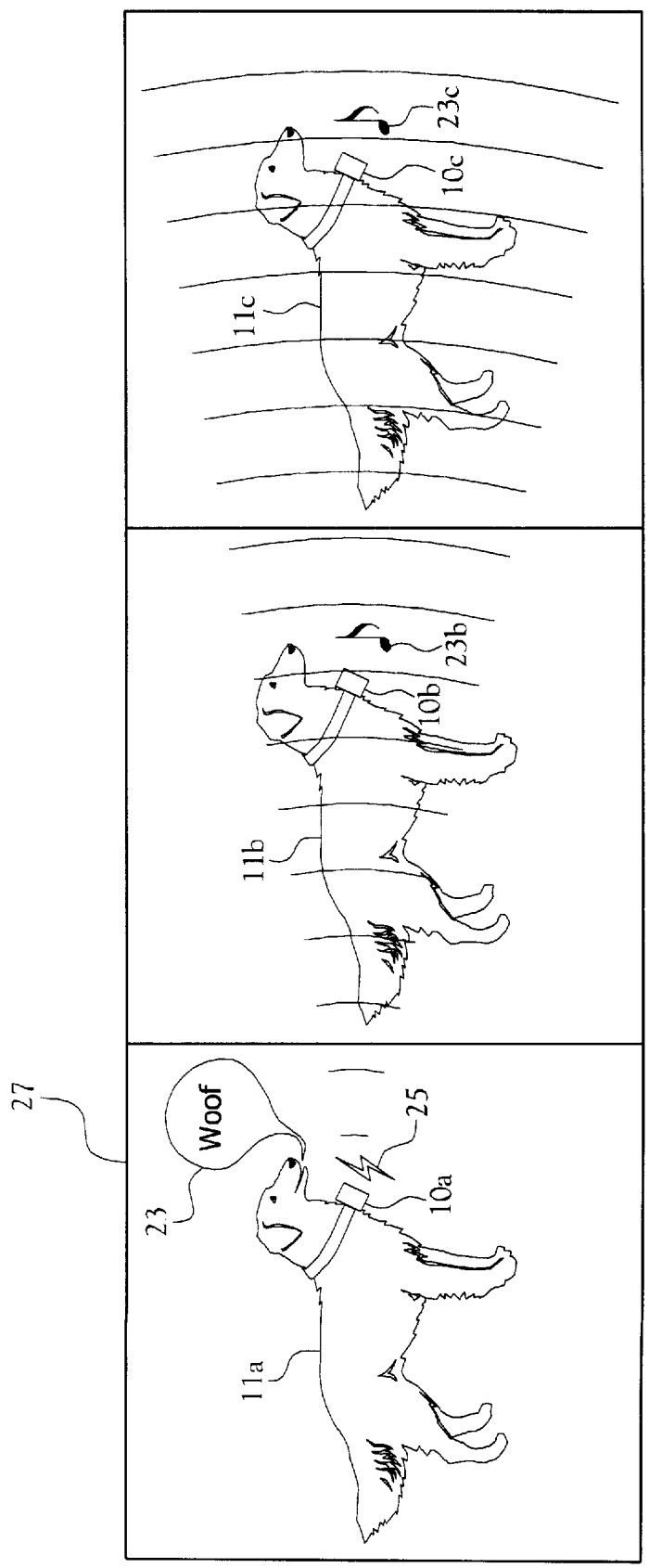
FIG. 2 is a depiction of the present invention in use on multiple dogs within a kennel.

FIG. 2 illustrates a kennel 27 hosting a plurality of dogs 11a, 11b, 11c each wearing the group bark control apparatus 10a, 10b, 10c.

Assume that the first dog 11a wearing the first group bark control apparatus 10a begins to bark 23. As previously described the first dog 11a receives an appropriate correction 25a in response to the bark. However, to effectuate the group bark control function, the controller 14a also activates the transmitter 18a to broadcast the desired correction signal. Further assume that the second and third group bark control apparatuses 10c are within the broadcast range of the transmitter 18a. The receivers 20b, 20c detect the correction signal which is passed to the controller 14b, 14c for processing. The controller 14b, 14c then activates the deterrent stimulus generator 16b, 16c to apply the appropriate deterrent stimulus 25b, 25c to the second and third dogs 11b, 11c which are not currently barking. By preemptively correcting the non-barking second and third dogs 11b, 11c in response to the barking of the first dog 11a, the phenomenon known as group barking is hereby avoided. Generally, the deterrent stimulus applied to the barking dog is a correction stimulus known to those skilled in the art, such as an electrostatic shock, and the deterrent stimulus applied to a non-barking dog is a warning stimulus known to those skilled in the art, such as an audible tone. However, other correction schemes can be used as desired.

Figure 3:
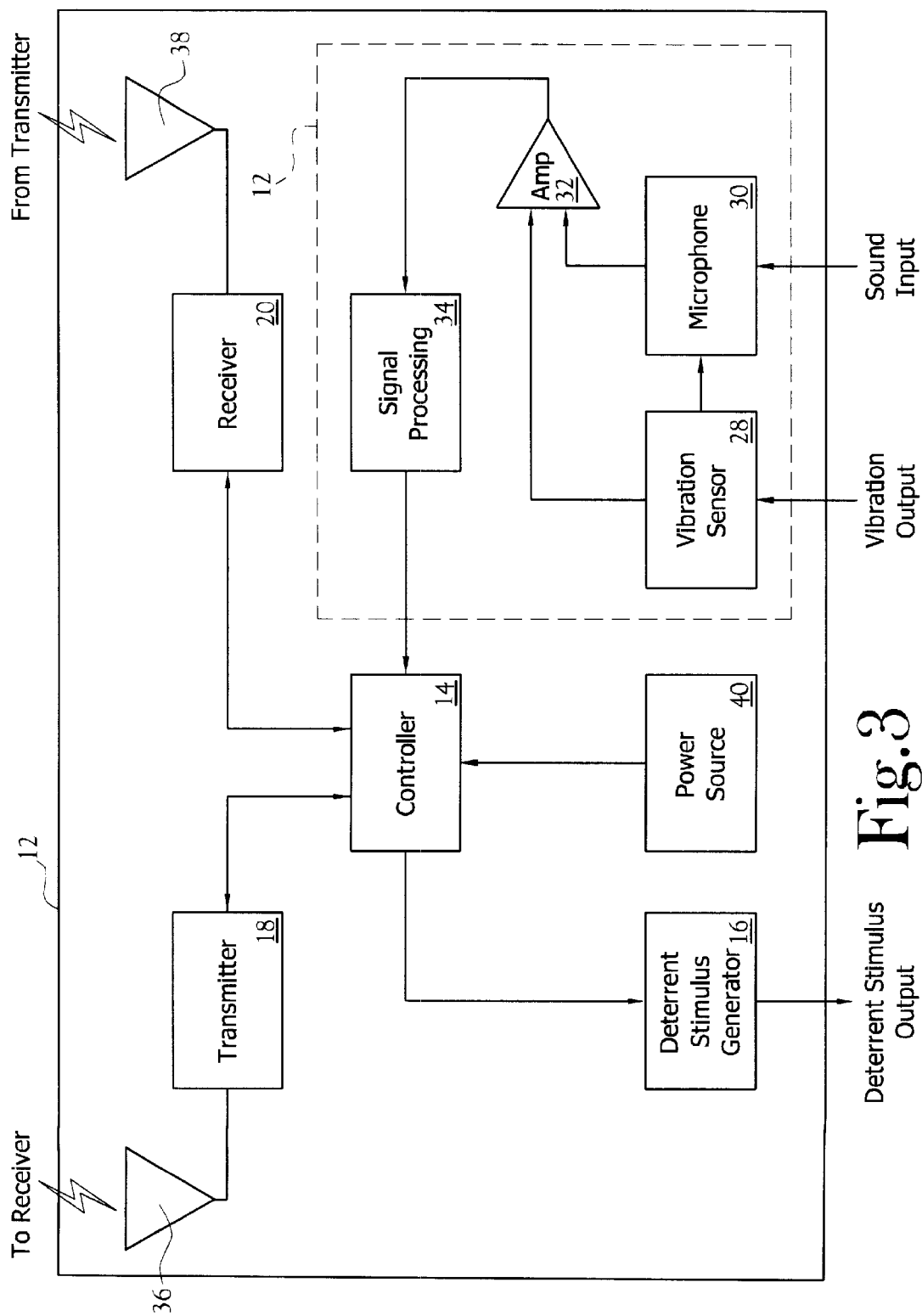
FIG. 3 is a schematic diagram of one embodiment of the present invention.

FIG. 3 illustrates a schematic diagram of the preferred embodiment of the group bark control apparatus 10. The bark sensor 12 includes both a vibration sensor 28 and a microphone 30. One such microphone/vibration sensor combination is disclosed in U.S. Pat. No. 5,927,233 issued to Mainini, et. al., on Jul. 27, 1999. Mainini, et al., teach a bark control system for training a dog not to bark. The bark control system includes a vibration sensor and a microphone either operating independently or in tandem with the vibration sensor gating the microphone. The output of the vibration sensor and the microphone are processed to discriminate the target dog's bark from other noises. When the discrimination result indicates that the sound is a bark, a stimulus delivery device applies a corrective stimulus. To further improve bark discrimination, a memory device stores an exemplary bark for comparison. Each bark sampled replaces the bark previously stored permitting the bark control system to adapt to any repetitive bark sequence of the target dog. Alternatively, the microphone/vibration sensor combination is employed to warn the dog 11 wearing the group bark control apparatus 10 not to respond to the barking of nearby dogs not wearing a group bark control apparatus 10, i.e., not having a transmitter 18. Such a system is implemented by continuous operation of the microphone 30 to detect any barking noises and continuous operation of the vibration sensor 28 to detect a bark produced by the host dog 11. A correction stimulus is applied to the host dog 11 upon activation of either the vibration sensor 28 or the microphone/vibration sensor combination and a warning stimulus is applied to the host dog 11 when the microphone 30 detects a bark independent of the vibration sensor 28.

In the illustrated embodiment, the bark sensor 12 further includes additional signal processing electronics including an amplifier 32 and a filter 34. Those skilled in the art will recognize that the signal processing electronics used may vary depending upon the configuration bark sensor 12 and can be implemented in a number of ways known to those skilled in the art including both discrete components or an integrated signal processor. The controller receives the output of the signal processing electronics, in the illustrated embodiment, the filter 34, for processing. Should the output of the bark sensor 12 indicate that the host dog 11 is barking, the controller 14 then generates the appropriate deterrents. In the preferred embodiment, the controller 14 is a programable processing device capable of producing the desired deterrent signals. First, in response to barking by the host dog 11, the controller 14 activates the deterrent stimulus generator 16 which applies the desired deterrent stimulus to the barking dog 11. Next, the controller produces a deterrent request signal which is broadcast by the transmitter 18 via the transmission antenna 36. Those skilled in the art will recognize that other implementations for the signal generation are available, such as where the controller serves to primarily perform a gating function and pass the output to external signal generators.

The transmission from the transmitter 18 is a radio frequency signal which indicates that a deterrent stimulus should be applied to other dogs 11 within the group. Additionally, those skilled in the art will recognize that signal can be coded with an identification allowing for discrimination between separate groups of group bark control apparatuses within a given range. The receiver 20 is configured to receive the signal broadcast from the transmitter 18, thereby allowing communication between multiple group bark control apparatuses 10. The receiver 20 passes the received deterrent request signal to the controller 14 for processing. The controller 14 then activates the deterrent stimulus generator 16 to produce the desired deterrent stimulus. Generally, each group bark control apparatus 10 is selectively programmable to allow a different deterrent stimulus type to be applied to the particular dog based upon that dog's propensity to group bark. Some dogs may be easily deterred using a standard warning stimulus. Other dogs may ignore a warning stimulus and require a correction stimulus to refrain from joining other dogs in barking. Those skilled in the art will recognize that the deterrent stimulus type can be coded into the deterrent stimulus request signal, if desired, and that the group bark control apparatus 10 can be configured to allow either the individual unit setting or the broadcast deterrent request signal to override the other.

Finally, the group bark control apparatus must be configured to deal with competing simultaneous signals. For example, the barking dog is subjected to a deterrent stimulus initiated by the controller and deterrent stimulus request is broadcast by the transmitter and received at the receiver within the same unit. Accordingly, the controller must respond to these multiple inputs. In one embodiment, the controller could deactivate the receiver while the transmitter is active. In another embodiment, the controller preferentially activates the deterrent stimulus generator in response to the detected bark over an incoming signal from the receiver, effectively ignoring the receiver while the host dog is barking.

Those skilled in the art will recognize other modifications and enhancements common to electronic bark control apparatuses which can be included without interfering with the objects and advantages of the present invention. Such modifications include, but are not limited to, the use of power saving circuitry to reduce the power consumption requirements of battery powered components, excessive correction prevention circuitry, and intensity level selection circuitry for the varying the intensity level of the applied deterrent stimuli.

The method for controlling the barking of dogs within a group is described as follows. Each dog within the group is fitted with a group bark control apparatus. When a bark is detected from one of the dogs in the group, the barking dog receives an immediate deterrent stimulus selected to discourage the dog from continuing to bark. A deterrent stimulus request is broadcast to other bark control apparatuses worn by the other dogs in the group. Upon receipt of the deterrent stimulus request, each bark control apparatus applies a selected deterrent stimulus to the dog. The deterrent stimulus is selected to discourage the dog from joining other dogs in barking. For any dog which is barking, the deterrent for barking is given preference over a competing deterrent request, if any.

From the foregoing description, it will be recognized by those skilled in the art that a group bark control apparatus and method for use with multiple dogs offering advantages over the prior art has been provided. Specifically, the group bark control apparatus provides a device for effectively deterring a group of dogs from barking in response to the barking of other nearby dogs by applying a deterrent stimulus to the barking dog and broadcasting a deterrent request signal to other nearby group bark control apparatuses causing the non-barking dogs to receive the desired deterrent stimulus.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. An apparatus for controlling the barking of a group of dogs, said apparatus comprising:
    a bark sensor;
    a controller in electrical communication with said bark sensor, said controller producing a bark signal upon detection of a bark by one of the group of dogs;
    a signal generator in electrical communication with said controller, said signal generator generating a stimulus request signal;
    a transmitter in electrical communication with said signal generator and said controller, said transmitter broadcasting said stimulus request signal;
    a receiver in electrical communication with said controller, said receiver receiving said stimulus request signal; and
    a deterrent stimulus generator in electrical communication with said controller, said deterrent stimulus generator applying a selected deterrent stimulus, to at least one of the group of dogs upon receipt of either said bark signal and said stimulus request signal, said deterrent stimulus being at least one of a warning stimulus and a correction stimulus.

2. The apparatus of claim 1 wherein said receiver is deactivated while said stimulus request signal is being broadcast.

3. The apparatus of claim 1 wherein said deterrent stimulus generator responds to said bark signal when both said bark signal and said stimulus request signal are present.

4. An apparatus for controlling the barking of group of dogs, said apparatus comprising:
    means for detecting a bark by one of the group of dogs;
    means for producing a bark signal upon detection of the bark;
    means for producing a stimulus request signal upon detection of the bark;
    means for broadcasting said stimulus request signal;
    means for receiving said stimulus request signal;
    means for generating a deterrent stimulus in response to either of said bark signal and said stimulus request signal, said deterrent stimulus being at least one of a warning stimulus and a correction stimulus;
    means for applying said deterrent stimulus to one of the group of dogs.

5. The apparatus of claim 4 further comprising means to temporarily deactivate said means for receiving said stimulus request signal while said stimulus request signal is being broadcast.

6. The apparatus of claim 4 wherein said means for generating a corresponding deterrent stimulus responds to said bark signal when both said bark signal and said stimulus request signal are present.

7. A method for controlling the barking of a group of dogs, said method comprising the steps of:
    (a) detecting a bark from one of the group of dogs identified as a barking dog, each other of the group of dogs being a non-barking dog;
    (b) applying a first deterrent stimulus to said barking dog, said first deterrent stimulus being either of a warning stimulus and a correction stimulus;
    (c) generating a stimulus request signal;
    (d) broadcasting said stimulus request signal from a transmitter worn by said barking dog;
    (e) receiving said stimulus request signal at a receiver worn by at least one of the group of dogs; and
    (f) applying a second deterrent stimulus to each non-barking dog, said second deterrent stimulus being either of a warning stimulus and a corrective stimulus.

8. A method for controlling the barking of a group of dogs, said method comprising the steps of:
    (a) detecting a bark from one of the group of dogs identified as a barking dog, each other of the group of dogs being a non-barking dog;

(b) applying a first deterrent stimulus to said barking dog, said first deterrent stimulus being either of a warning stimulus and a correction stimulus;

(c) broadcasting a deterrent stimulus request; and (d) applying a second deterrent stimulus to each said non-barking dog upon receipt of said deterrent stimulus request, said second deterrent stimulus being either of a warning stimulus and a correction stimulus.

9. A method for controlling the barking of a target dog, said method comprising the steps of:

(a) detecting a bark;

(b) identifying said bark as either of an ambient bark not produced by the target dog and a local bark produced by the target dog;

(c) applying a first deterrent stimulus to the target dog upon detection of an ambient bark, said first deterrent stimulus being either of a warning stimulus and a correction stimulus; and (d) applying a second deterrent stimulus to the target dog upon detection of a local bark, said second deterrent stimulus being either of a warning stimulus and a corrective stimulus.

\* \* \* \* \*